United States Patent
Schümann et al.

(10) Patent No.: US 9,920,223 B2
(45) Date of Patent: Mar. 20, 2018

(54) DOUBLE-SIDED ADHESIVE TAPE HAVING A FIRST OUTER IMPACT-ADHESIVE SIDE AND A SECOND OUTER SIDE THAT CAN BE HEAT ACTIVATED

(71) Applicant: TESA SE, Hamburg (DE)

(72) Inventors: Uwe Schümann, Pinneberg (DE); Kirstin Weiland, Hamburg (DE); Hermann Neuhaus-Steinmetz, Ahrensburg (DE); Dennis Perlbach, Neu Wulmstorf (DE); Arne Koops, Neu-Lankau (DE); Thomas Schubert, Hamburg (DE); Olga Kirpicenok, Hamburg (DE); Sarah Reich, Hamburg (DE)

(73) Assignee: TESA SE, Norderstedt (DE)

( * ) Notice: Subject to any disclaimer, the term of this patent is extended or adjusted under 35 U.S.C. 154(b) by 60 days.

(21) Appl. No.: 14/403,634

(22) PCT Filed: May 15, 2013

(86) PCT No.: PCT/EP2013/059988
§ 371 (c)(1),
(2) Date: Nov. 25, 2014

(87) PCT Pub. No.: WO2013/178462
PCT Pub. Date: Dec. 5, 2013

(65) Prior Publication Data
US 2015/0159053 A1    Jun. 11, 2015

(30) Foreign Application Priority Data
May 30, 2012    (DE) .................. 10 2012 209 116

(51) Int. Cl.
C08J 7/02    (2006.01)
C09J 7/02    (2006.01)
(Continued)

(52) U.S. Cl.
CPC .......... *C09J 7/0203* (2013.01); *B32B 37/182* (2013.01); *B32B 38/0008* (2013.01);
(Continued)

(58) Field of Classification Search
CPC . C09J 7/00; C09J 7/0207; C09J 7/0214; C09J 7/0217; C09J 5/02; C09J 2201/134;
(Continued)

(56) References Cited

U.S. PATENT DOCUMENTS

| 4,906,421 A * | 3/1990 | Plamthottam | .............. | C09J 7/02 264/101 |
| 5,593,759 A | 1/1997 | Vargas et al. | | |

(Continued)

FOREIGN PATENT DOCUMENTS

| DE | 10153677 A1 | 5/2003 |
| DE | 60110216 T2 | 1/2006 |

(Continued)

OTHER PUBLICATIONS

Machine Translation of JP 2009-086452A (2009).*
(Continued)

*Primary Examiner* — Scott R Walshon
(74) *Attorney, Agent, or Firm* — Norris McLaughlin & Marcus PA (57) ABSTRACT

A double-sided adhesive tape having a first outer impact-adhesive side and a second outer side that can be heat activated, comprising an at least two-layer product structure comprising the layers A and B. Layer A is an impact-adhesive layer chemically cross-linked by means of thermal initiation or an impact-adhesive carrier layer chemically cross-linked by means of thermal initiation. Layer B is a layer on the basis of a thermoplastic plastic. Layer A and layer B are in direct contact with each other, and the surface of layer B that is in direct contact with layer A has been
(Continued)

corona- or plasma-pretreated. The double-sided adhesive tape is characterized in that the corona or plasma pretreatment is performed in an atmosphere comprising nitrogen, carbon dioxide, or a noble gas or a mixture of at least two of said gases.

8 Claims, 1 Drawing Sheet

(51) Int. Cl.

| | | |
|---|---|---|
| C09J 5/02 | (2006.01) | |
| C09J 7/00 | (2018.01) | |
| C09J 123/02 | (2006.01) | |
| C09J 123/14 | (2006.01) | |
| C08L 23/02 | (2006.01) | |
| C08G 18/48 | (2006.01) | |
| C08G 18/66 | (2006.01) | |
| C08G 18/75 | (2006.01) | |
| C08G 18/12 | (2006.01) | |
| C08G 18/32 | (2006.01) | |
| C09J 175/08 | (2006.01) | |
| B32B 37/18 | (2006.01) | |
| B32B 38/00 | (2006.01) | |
| C08L 23/14 | (2006.01) | |
| C09J 133/08 | (2006.01) | |
| C09J 175/04 | (2006.01) | |
| C09J 177/00 | (2006.01) | |

(52) U.S. Cl.
CPC ......... *C08G 18/12* (2013.01); *C08G 18/3206* (2013.01); *C08G 18/4812* (2013.01); *C08G 18/4825* (2013.01); *C08G 18/4829* (2013.01); *C08G 18/6674* (2013.01); *C08G 18/755* (2013.01); *C08L 23/02* (2013.01); *C09J 5/02* (2013.01); *C09J 7/00* (2013.01); *C09J 7/0207* (2013.01); *C09J 7/0217* (2013.01); *C09J 123/02* (2013.01); *C09J 123/14* (2013.01); *C09J 175/08* (2013.01); *C08G 2170/20* (2013.01); *C08L 23/14* (2013.01); *C08L 2205/02* (2013.01); *C09J 133/08* (2013.01); *C09J 175/04* (2013.01); *C09J 177/00* (2013.01); *C09J 2201/134* (2013.01); *C09J 2201/36* (2013.01); *C09J 2201/40* (2013.01); *C09J 2201/606* (2013.01); *C09J 2201/61* (2013.01); *C09J 2423/00* (2013.01); *C09J 2423/10* (2013.01); *C09J 2433/00* (2013.01); *C09J 2467/005* (2013.01); *C09J 2475/00* (2013.01); *C09J 2477/00* (2013.01); *Y10T 428/249983* (2015.04); *Y10T 428/2826* (2015.01)

(58) Field of Classification Search
CPC ............. C09J 2201/36; C09J 2201/606; C09J 2201/61; C08J 7/123; B32B 27/16; B32B 2266/0278
See application file for complete search history.

(56) References Cited

U.S. PATENT DOCUMENTS

| | | | |
|---|---|---|---|
| 6,630,531 B1 * | 10/2003 | Khandpur | B32B 5/18 524/505 |
| 7,217,455 B2 * | 5/2007 | Valdez | 428/343 |
| 2003/0113533 A1 | 6/2003 | Husemann et al. | |
| 2010/0055435 A1 | 3/2010 | Neubert et al. | |
| 2010/0137524 A1 | 6/2010 | Grittner et al. | |
| 2011/0111221 A1 | 5/2011 | Schumann et al. | |
| 2014/0127501 A1 * | 5/2014 | Schumann et al. | 428/349 |

FOREIGN PATENT DOCUMENTS

| | | |
|---|---|---|
| DE | 102006057800 A1 | 6/2008 |
| DE | 102008059050 A1 | 5/2010 |
| DE | 102009046657 A1 | 5/2011 |
| DE | 102011075140 A1 | 11/2011 |
| EP | 0384598 A1 | 8/1990 |
| EP | 1262532 A1 | 12/2002 |
| EP | 1262532 B1 | 4/2005 |
| EP | 2192148 A1 | 6/2010 |
| JP | 2004530754 A | 10/2004 |
| JP | 200986452 A | 4/2009 |
| JP | 2009086452 A * | 4/2009 |
| JP | 2010126726 A | 6/2010 |
| WO | 02097000 A1 | 12/2002 |
| WO | 2012152712 A1 | 11/2012 |
| WO | 2012152713 A1 | 11/2012 |

OTHER PUBLICATIONS

German Search Report for application 10 2012 209 116.5 dated May 30, 2012.
International Search Report for PCT/EP2013/059988 dated Aug. 23, 2013.
M. Yang, et al., "Polymer Materials Handbook", vol. II, Chemical Industry Press, p. 627, 2009.
Z. Tong, "The latest design and preparation handbook of adhesives", Chemical Industry Press, p. 267, 2010.
English translation of Chinese Office Action for corresponding application 201380027799.7 dated Aug. 28, 2015.
English translation of Chinese Search Report for corresponding application 201380027799.7 dated Aug. 28, 2015.
M. Yang, et al., "Polymer Materials Handbook", vol. II, Chemical Industry Press, p. 627, 2009, English translation included.
Z. Tong, "The latest design and preparation handbook of adhesives", Chemical Industry Press, p. 267, 2010, English translation included.
English translation of JP Office Action for corresponding application JP 2015-514407 dated May 24, 2017.
Anonymous, "RADCURE—Energy Curable Resins Product Guide—Coating and Inks Americas", Cytec Surface Specialties Inc., USA, found on the Internet: http://www.engichem.com.in/pdf/allnex, pp. 1-28, Jan. 1, 2006.
European Search Report for corresponding application EP 13 724 225.1-1102 dated Jan. 10, 2018.

* cited by examiner

DOUBLE-SIDED ADHESIVE TAPE HAVING A FIRST OUTER IMPACT-ADHESIVE SIDE AND A SECOND OUTER SIDE THAT CAN BE HEAT ACTIVATED

This application is a 35 USC 371 application of PCT/EP2013/059988 filed May 15, 2013, which claims priority to the DE application 10 2012 209 116.5 filed May 30, 2012.

The present invention relates to a double-sided adhesive tape having a pressure-sensitive adhesive side and a heat-activatable, heat-sealable side.

For industrial pressure-sensitive adhesive tape applications it is very common to use double-sided adhesive tapes in order to bond two materials to one another. For the extremely wide variety of deployment slants the requirements are in some cases highly specific, and so exacting requirements are imposed on the corresponding tapes. In the automobile segment, for example, there is very often a requirement for high temperature stability and also high resistance toward solvents and service media such as fuels. These properties are fulfilled in very good form by means of crosslinked pressure-sensitive acrylate adhesives (acrylate PSAs).

In the industrial segment likewise, moreover, the substrates that may be bonded vary very widely. Here it may in some cases be an advantage to use heat-sealable adhesives, which soften above a defined temperature, flow very effectively onto the substrates, and then cool to produce a firm assembly.

U.S. Pat. No. 6,124,032 B1, for example, describes a heat-activatable adhesive tape for sealing cartons. The requirements within this segment, however, are very forgiving, since the forces which act on the adhesive tape through the carton are relatively low. This is also reflected in the carrier material, which consists of paper. The focus, therefore, is not on bond strength but instead on a production method for a keenly priced pressure-sensitive adhesive tape.

U.S. Pat. No. 5,593,759 A describes a double-sided pressure-sensitive adhesive tape which is composed of a carrier layer coated with two thin PSAs. The carrier layer consists of a structural adhesive. On thermal activation, the PSA blends with the structural PSA, which likewise fully cures. By this route, very firm bonds between two adherends are possible. For many applications, nevertheless, this pressure-sensitive adhesive tape has an elementary disadvantage, since right from the start the double-sided pressure-sensitive adhesive tape is tacky on both sides. There are a host of applications for which it is an advantage if the pressure-sensitive adhesive tape at least on one side is nontacky and therefore possesses optimum repositionability. In U.S. Pat. No. 5,593,759 A this advantage is absent.

U.S. Pat. No. 4,248,748 A describes heat-activatable polyacrylate PSAs with additions of resin. The additions of resin raise the glass transition temperature of the polyacrylate PSA and therefore the tack at room temperature. The heat-activatable PSAs, however, are used only for single-sided pressure-sensitive adhesive tapes (film bonding, etc.). Hence no exacting requirements are imposed on the bonding of adherends or on the anchorage of heat-activatable PSAs to the film.

U.S. Pat. No. 4,199,646 A describes heat-activatable pressure-sensitive adhesive tapes, where the heat-activatable PSA has a modulus of elasticity of 10 to 300 kg/cm$^2$. At the activation temperature, therefore, the modulus is situated at the level of PSAs at room temperature. In this patent as well—in analogy to U.S. Pat. No. 4,248,748 A—the bond strength and the elasticity are controlled via the composition of the PSA. Moreover, only double-sided heat-activatable pressure-sensitive adhesive tapes are described, which can be heat-activated only on both sides.

EP 1 262 532 A1 describes a dual-function adhesive tape with a heat-activatable tackifier resin layer of polyolefin and with an acrylate PSA, the polyolefin layer being N$_2$ corona-treated to achieve good anchorage of the two layers to one another. The specification describes only acrylate PSAs polymerized by irradiation with UV light. A disadvantage of this is the limited coating rate, since polymerization takes place during the coating operation, and therefore monomer conversion and degree of polymerization are dependent on the coating rate. The relatively high residual monomer contents may be a further problem. It has emerged, moreover, that the N$_2$ corona treatment of the polyolefin layer, in combination with others apart from the UV polymers described, does not always lead to satisfactory results in terms of the bond strength between the PSA and the polyolefin, particularly if at the time of backing, the PSAs are not yet crosslinked.

In EP 0 384 598 A1 as well a dual-functional adhesive tape is described, with a heat-activatable tackifier resin layer of polyolefin and with an acrylate PSA polymerized by irradiation with UV light. In this case the anchorage to the polyolefin layer is achieved by means of a graft-polymerized monomer. A disadvantage here again is the limited coating rate, since here as well the UV light-initiated polymerization occurs during the coating operation, and hence monomer conversion and degree of polymerization are not independent of the coating rate, and also, furthermore, the grafting reaction takes place during the coating operation and is therefore likewise in correlation with the coating rate.

EP 1 308 492 A1 describes a three-layer adhesive tape, the middle layer being a crosslinked polyurethane carrier material, and outer layer A being a heat-activatable adhesive. A disadvantage here is the anchorage between the heat-activatable outer layer A and the crosslinked polyurethane carrier material, especially after treatments under hot and humid conditions, said anchorage not being of untrammeled quality for all areas of application.

Heat-activatable adhesive tapes can be used for producing composite articles. EP 1 262 532 A1 describes one such composite article. The disadvantages arise from the above-depicted disadvantages of the adhesive tape described therein.

EP 0 679 123 B1 discloses a composite profile composed of an adhesive tape and a sealing profile. To form the composite assembly, a foam carrier layer which is part of an adhesive tape is subjected there to incipient melting. A disadvantage is that as a result the foam loses its foam structure, at least partially, and the adhesive tape therefore suffers detractions from its characteristic adhesive qualities.

The inventive adhesive tape should be capable of simultaneously fulfilling various functions.

The adhesive tape is to have two different sides. One side is to be pressure-sensitively adhesive, the other side heat-activatable and therefore heat-sealable.

By heat-activatable is meant that the side is to soften or melt, or at least partially melt, by introduction of higher temperatures, in order to be able to flow onto the substrate that is to be bonded, to melt onto the substrate, or to fuse with the substrate. By heat-sealable is meant that the side, following introduction of higher temperatures in a laminating or backing operation, is intended to be able to flow onto the substrate that is to be bonded, to melt onto the substrate, or to fuse with the substrate. "Higher temperatures" are all temperatures above room temperature, preferably temperatures which lie at least by 20° C. above room temperature, more preferably temperatures which lie at least by 40° C. above room temperature. Room temperature in this invention means 23° C. The bond strength between the layers of the adhesive tape is always to be of a quality such that on failure of the adhesive tape there is never delamination between the individual layers of the adhesive tape, but instead always a failure within a layer. This is to be the case even after treatment of the adhesive tape under hot and humid conditions. Very high layer thicknesses are to be obtainable, and are to be realizable in foamed or foamlike form as well. Thick foamlike layers may greatly increase not only the bond strength but also the shear strength of an adhesive tape. The adhesive tape is to hold reliably even at relatively high temperatures, such as may typically occur in the interior of an automobile. For economic reasons, the adhesive tape is to be producible with a high coating speed. The adhesive tape is to be suitable for producing composite articles and for adhesively bonding EPDM profiles and other rubberlike profiles, more particularly sealing profiles in the automobile segment.

The object of the invention, in summary, is to satisfy the demand for further heat-activatable adhesive tapes which fulfill the recited functions and which do not exhibit the outlined disadvantages of the prior art, or not to the same extent.

This object is achieved by means of an adhesive tape as set out according to the main claim. The dependent claims provide advantageous developments of the adhesive tape, methods for producing same, and possibilities for use.

The invention accordingly provides a double-sided adhesive tape having a first outer pressure-sensitive adhesive side and a second outer heat-activatable side, comprising an at least two-layer product system composed of layers A and B,
  layer A being a layer of pressure-sensitive adhesive crosslinked chemically by thermal initiation, or a pressure-sensitively adhesive carrier layer crosslinked chemically by thermal initiation,
  layer B being a layer based on a thermoplastic polymer, layer A and B being in direct contact with one another, and the surface of layer B that is in direct contact with layer A having been corona- or plasma-pretreated,
  and the corona or plasma pretreatment has taken place in atmosphere of nitrogen, carbon dioxide, or a noble gas, or a mixture of at least two of these gases.

Surprisingly it has been found that double-sided adhesive tapes of this kind, with a pressure-sensitively adhesive side and a heat-activatable side, meet the requirements to outstanding effect.

Layer A is a layer of pressure-sensitive adhesive that is crosslinked chemically by thermal initiation, or is a pressure-sensitively adhesive carrier layer crosslinked chemically by thermal initiation. A layer of pressure-sensitive adhesive or a pressure-sensitively adhesive layer means, in this invention as in general linguistic usage, a layer which—especially at room temperature—is durably tacky and also adhesive. This layer may be an outer, at all times tangible layer of an adhesive tape, and may also be a middle layer which is therefore visible and perceptible at all times only at the outside edges. Characteristic of such a layer is that it can be applied to a substrate by means of pressure, and remains adhering there, with the pressure to be employed and the duration of that pressure not being defined in more detail. In certain cases, depending on the precise nature of the PSA, on the temperature and the atmospheric humidity, and on the substrate, a minimal pressure acting for a short time, which does not go beyond a gentle contact for a brief moment, is sufficient to obtain the adhesion effect; in other cases, a longer-term duration of exposure to a high pressure may also be necessary.

PSA layers or pressure-sensitively adhesive layers have particular, characteristic viscoelastic properties, which result in the durable tack and adhesiveness.

These layers, characteristically, when mechanically deformed, give rise both to viscous flow processes and also to the development of elastic resilience forces. In terms of their respective fraction, the two processes are in a particular relationship with one another, dependent not only on the precise composition, structure, and degree of crosslinking of the PSA layer in question, but also on the rate and duration of the deformation, and on the temperature.

The proportional viscous flow is necessary for the achievement of adhesion. Only the viscous components, produced by macromolecules with relatively high mobility, allow effective wetting and effective flow onto the substrate to be bonded. A high viscous flow component results in high pressure-sensitive adhesiveness (also referred to as tack or surface tackiness) and hence often also in a high bond strength. Owing to a lack of flowable components, highly crosslinked systems, or polymers which are crystalline or have undergone glasslike solidification, generally have at least little tack, or none at all.

The proportional elastic resilience forces are necessary for the achievement of cohesion. They are brought about, for example, by very long-chain, highly entangled macromolecules and also by physically or chemically crosslinked macromolecules, and permit transmission of the forces engaging on an adhesive bond. Their result is that an adhesive bond is able to withstand sufficiently over a prolonged time period a long-term load acting on it, in the form for example of a sustained shearing load.

For a more precise description and quantification of the extent of elastic and viscous components, and also of the ratio of the components to one another, it is possible to employ the variables of storage modulus (G') and loss modulus (G"), which can be determined by means of Dynamic Mechanical Analysis (DMA). G' is a measure of the elastic component, G" a measure of the viscous component, of a substance and of the layer produced from it. Both variables are dependent on the deformation frequency and the temperature.

The variables can be determined by means of a rheometer. In this case, the material in layer form for analysis is exposed to a sinusoidally oscillating shearing stress in—for example—a plate/plate arrangement. In the case of instruments operating with shear stress control, the deformation is measured as a function of time, and the time offset of this deformation relative to the introduction of the shearing stress is measured. This time offset is identified as phase angle $\delta$.

The storage modulus G' is defined as follows: $G'=(\tau/\gamma)*\cos(\delta)$ ($\tau$=shear stress, $\gamma$=deformation, $\delta$=phase angle=phase shift between shear stress vector and deformation vector). The definition of the loss modulus G" is as follows: $G''=(\tau/\gamma)*\sin(\delta)$ ($\tau$=shear stress, $\gamma$=deformation, $\delta$=phase angle=phase shift between shear stress vector and deformation vector).

A substance and the layer produced from it are generally considered to be pressure-sensitively adhesive, and are defined for the purposes of this invention as being pressure-sensitively adhesive, if at room temperature, here by definition at 23° C., at least one section of the G' plot lies within the window spanned by the deformation frequency range from $10^0$ inclusive up to $10^1$ inclusive rad/sec (abscissa) and also by the range of the G' values from $10^3$ inclusive to $10^7$ inclusive Pa (ordinate), and if at least one section of the G" plot likewise lies within this window. Substances of this kind are occasionally referred to as viscoelastic substances, and the layers produced from them as viscoelastic layers. In this invention, the terms "pressure-sensitively adhesive" and "viscoelastic" are considered to be synonymous. Reference to a pressure-sensitively adhesive carrier layer, accordingly, in this invention means a viscoelastic carrier layer within the stated limits for G' and G".

A layer of pressure-sensitive adhesive or a pressure-sensitively adhesive carrier layer is chemically crosslinked if the PSA layer or pressure-sensitively adhesive carrier layer has attained, through chemical reaction with a crosslinker, a state which renders it no longer meltable and no longer soluble in organic solvents. Liquefaction is then possible only through decomposition which is irreversible. Crosslinkers contemplated include all at least difunctional substances which are able to enter into chemical crosslinking reactions with the functional groups of the PSA. Their selection is guided by the functional groups of the PSA. PSAs which carry carboxyl groups are typically crosslinked with diepoxides or polyepoxides, possibly with additional catalysis, by, for example, tertiary amines, or with metal acetylacetonates, metal alkoxides, and alkoxy-metal acetylacetonates. For the crosslinking of PSAs which carry hydroxyl groups, diisocyanates or polyisocyanates are appropriate examples.

The term "thermal initiation" indicates that the crosslinker or the crosslinker system, consisting of crosslinker, accelerator and/or initiator, enters into the chemical crosslinking reaction by temperature exposure, and not by radiation exposure. The chemical crosslinking reaction is accordingly activated and triggered by temperature exposure. This invention reckons the thermally initiated crosslinking forms to include systems where the activating energy can be overcome even at room temperature or below room temperature without additional application of radiation—in other words, in which the crosslinking reaction proceeds even at room temperature or below.

The crosslinking reactions in this invention, then, are initiated not by actinic radiation or by ionizing radiation such as, for instance, UV rays, X-rays, or electron beams. In one preferred embodiment of this invention, additional crosslinking forms, initiated by actinic or by ionizing radiation, are excluded, since surprisingly it has been found that the bond strength between the layers A and B of the adhesive tape is impaired in certain cases by additional exposure to actinic or ionizing radiation.

In one preferred method, layer A is produced in a hotmelt process, more particularly an extrusion process. For this purpose, the pressure-sensitively adhesive material from which the PSA layer crosslinked chemically by thermal initiation, or the pressure-sensitively adhesive carrier layer A crosslinked chemically by thermal initiation, is to be produced, is introduced in the melted state into a continuously operating mixing assembly, preferably an extruder. Also introduced into the continuously operating mixing assembly is the crosslinker system, and the so the crosslinking reaction is commenced. This is followed by the melt, which at this point in time is still not crosslinked, being discharged from the mixing assembly and being immediately coated and shaped to form the layer A. The crosslinking reaction that has been commenced progresses in the meantime, and so a short time later, layer A has attained its crosslinked state. The principal advantages of this method are that high coating speeds can be realized and that the layers that can be produced are thicker than with a solvent-based method. Surprisingly, layers (A) which have been produced by a method of this kind can be attached in accordance with the invention with high bond strength to thermoplastic layers (B).

In an advantageous development of the invention, layer A is foamed or has a foamlike consistency. The foam or the foamlike consistency may have been produced by the introduction or chemical generation of one or more gases into the polymer matrix, or through the use of solid glass microspheres, hollow glass microspheres and/or plastic microspheres of any kind. Mixtures of the substances stated may also be used. The plastic microspheres may be used in preexpanded form or in an expandable but not preexpanded form wherein the expansion occurs during the preparation process.

The expandable plastic microspheres, also called microballoons, are hollow elastic spheres which have a thermoplastic polymer shell; consequently they are also referred to as expandable polymeric microspheres. These spheres are filled with low-boiling liquids or liquefied gas. Shell material used includes, in particular, polyacrylonitrile, polyvinyl dichloride (PVDC), polyvinyl chloride (PVC), polyamides, or polyacrylates. Suitable low-boiling liquids are, in particular, hydrocarbons of the lower alkanes, as for example isobutane or isopentane, which are enclosed under pressure as liquefied gas in the polymer shell. By action on the microballoons, more particularly by the action of heat—especially through supply of heat or generation of heat, as for example by means of ultrasound or microwave radiation—there is softening of the outer polymer shell. At the same time, the liquid propellant gas contained within the shell changes into its gaseous state. For a particular pairing of pressure and temperature—termed "critical pairing" for the purposes of this specification—the microballoons undergo irreversible, three-dimensional expansion. Expansion is at an end when the internal pressure equals the external pressure. Since the polymeric shell is retained, a closed-cell foam is obtained in this way.

A host of types of microballoon are available commercially, such as, for example, from Akzo Nobel, the Expancel DU (dry unexpanded) products, which differ essentially in their size (6 to 45 µm diameter in the unexpanded state) and their required expansion onset temperature (75° C. to 220° C.).

Furthermore, unexpanded microballoon products are also available in aqueous dispersion form with a solids fraction or microballoon fraction of about 40 to 45 weight %, and also in the form of polymer-bound microballoons (masterbatches), in ethyl-vinyl acetate, for example, with a microballoon concentration of about 65 weight %. Obtainable, furthermore, are microballoon slurry systems, in which the microballoons are present with a solids fraction of 60 to 80 weight % in the form of an aqueous dispersion. The microballoon dispersions, the microballoon slurries, and the masterbatches, like the DU products, are suitable for foaming in line with the advantageous development of the invention.

As a result of their flexible, thermoplastic polymer shell, the foams produced using microballoons posses a higher crack-bridging capacity than those filled with unexpandable, nonpolymeric hollow microspheres (such as hollow glass or ceramic spheres). They are therefore more suitable for compensating manufacturing tolerances of the kind that occur in the case of injection moldings, for example. Furthermore, a foam of this kind is able better to compensate thermal stresses.

Accordingly, through the selection of the thermoplastic resin of the polymer shell, for example, further influence may be exerted over the mechanical properties of the foam. Hence it is possible, for example, to produce foams with a higher cohesive strength than with the polymer matrix alone, despite the foam having a lower density than the matrix.

Moreover, typical foam properties, such as the capacity to conform to rough substrates, can be combined with a high cohesive strength for PSA foams.

Preferably up to 30 weight % of microballoons, more particularly between 0.5 weight % and 10 weight %, based on the overall formula of the polymer composition, are added for foaming to the polymer composition that is to be foamed.

In one preferred embodiment, layer A is a layer based on a known polyacrylate PSA crosslinked chemically by thermal initiation. Suitable crosslinkers for polyacrylate PSAs are diisocyanates or polyisocyanates, more particularly dimerized or trimerized isocyanates, diepoxide or polyepoxide compounds, epoxide-amine crosslinker systems, and, for coordinative crosslinking, metal acetylacetonates, metal alkoxides, and alkoxy-metal acetylacetonates, in each case in the presence of functional groups in the polymer macromolecules that are able to react with isocyanate groups and/or epoxide groups and also to enter into coordinative bonds with the metal compounds.

Advantageous crosslinker systems and suitable methods to allow processing of the polymer composition in the melt with such crosslinkers are described in, for example, the specifications EP 0 752 435 A, EP 1 802 722 A, EP 1 791 921 A, EP 1 791 922 A, EP 1 978 069 A, and DE 10 2008 059 050 A. The disclosure content of these specifications to this effect is therefore incorporated explicitly into the disclosure content of the present invention. The crosslinker or, in the case of crosslinker systems, at least one constituent of the crosslinker system (for example, either the crosslinker or the accelerator) is added to the melt only at a late stage and is immediately mixed in very homogeneously (by means of efficient mixing, in the extruder, for example), in order to make the residence time of the reactive system in the polymer melt very short and therefore the processing life ("pot life") as long as possible. The key part of the crosslinking reaction takes place only after the polymer has been shaped, more particularly after it has been shaped to form the layer, and preferably at room temperature. As a result of this procedure, two methodological aspects can be optimized with respect to one another, namely, on the one hand, a minimal crosslinking reaction prior to shaping, in order largely to avoid unwanted and uncontrolled preliminary crosslinking and the corresponding gelling (formation of more highly crosslinked regions—for example, gel specks—within the polymer melt), but on the other hand an extremely high mixing efficiency on the part of the crosslinker or crosslinking system components in the relatively short residence time in the polymer melt prior to coating, in order in fact to guarantee a very homogeneously crosslinked end product.

Having emerged as being particularly preferred, especially for the crosslinking of polyacrylate PSAs with functional groups suitable for entering into linking reactions with epoxide groups, is a crosslinker-accelerator system comprising at least one epoxide-group-containing substance as crosslinker and as accelerator at least one substance which has an accelerating effect on the linking reaction at a temperature below the melting temperature of the polyacrylate. Examples of suitable epoxide-group-containing substances include polyfunctional epoxides, especially difunctional or trifunctional epoxides (i.e., those having two or three epoxide groups, respectively), but also epoxides of higher functionality, or mixtures of epoxides with different functionalities. Accelerators which can be used with preference are amines (to be interpreted formally as substitution products of ammonia), examples being primary and/or secondary amines; more particularly, tertiary and/or polyfunctional amines are used. It is also possible to employ amines which have a plurality of amine groups, it being possible for these amine groups to be primary and/or secondary and/or tertiary amine groups, and more particularly diamines, triamines and/or tetramines. Selected more particularly are amines which do not enter into any reactions, or only into slight reactions, with the polymer building blocks. Further examples of accelerators which can be used are those with a phosphate basis, such as phosphines and/or phosphonium compounds.

By means of this method it is possible for polymers in particular based on acrylic esters and/or methacrylic esters to be both foamed and crosslinked, with advantageously at least some of the acrylic esters containing the functional groups, and/or comonomers being present which contain the functional groups. Suitable functional groups of the polymer to be crosslinked, especially (meth)acrylate-based, are, in particular, acid groups (carboxylic acid, sulfonic acid and/or phosphonic acid groups) and/or hydroxyl groups and/or acid anhydride groups and/or epoxide groups and/or amine groups, these groups being selected and more particularly attuned to the particular crosslinker. It is especially advantageous if the polymer contains copolymerized acrylic acid and/or methacrylic acid.

In another preferred embodiment, layer A is a layer based on a known polyurethane PSA crosslinked chemically by thermal initiation. Polyurethane PSAs crosslinked accordingly are described in, for example, EP 1 469 024 A1, EP 1 469 055 B1, EP 1849811 B1, or in EP 2 046 855 A1. Pressure-sensitively adhesive polyurethane hotmelt prepolymers which can be processed and crosslinked in an extrusion process are described in EP 2 276 784 A1. Particularly suitable crosslinkers for polyurethane PSAs are diisocyanates or polyisocyanates, more particularly dimerized or trimerized isocyanates. One particular crosslinking system is described in EP 2 325 220 A1. A process for producing a chemically crosslinked polyurethane film is described in EP 2 119 735 A1. The disclosure content of these specifications is explicitly incorporated into the disclosure content of the present invention.

Not only the advantageous polyacrylate PSAs but also the advantageous polyurethane PSAs may include further formulating ingredients such as, for example, fillers, resins, especially tackifying resins, plasticizers, flame retardants, aging inhibitors (antioxidants), light stabilizers, UV absorbers, rheological additives, and also other auxiliaries and adjuvants.

The outer surface of the layer B, which is identical to the second outer side of the adhesive tape, is heat-activatable and therefore heat-sealable.

By heat-activatable is meant that this outer surface, at higher temperatures, undergoes softening or melting or at least partial softening or melting, in order to be able to flow onto the substrate that is to be bonded, to melt onto the substrate, or to fuse with the substrate.

By heat-sealable is meant that this outer surface, following introduction of higher temperatures in a laminating or backing operation, is intended to be able to flow onto the substrate that is to be bonded, to melt onto the substrate, or to fuse with the substrate.

By higher temperatures are meant all temperatures above room temperature, preferably temperatures which lie at least by 20° C. above room temperature, more preferably temperatures which lie at least by 40° C. above room temperature.

Layer B is a layer based on a thermoplastic polymer and is therefore a thermally deformable, meltable, and weldable layer, the operations of deforming, melting, and welding being reversible and repeatable.

Preferred thermoplastic polymers are polyamide, polyesters, thermoplastic polyurethane, and polyethylene-vinyl acetate. Particularly preferred, especially for the bonding of EPDM profiles and other rubber profiles, are polyolefins or polyolefin copolymers or mixtures of the stated substances, more particularly polypropylene copolymers. Particularly preferred are ethylene-propylene copolymers or mixtures of ethylene-propylene copolymers and other polyolefins.

An ethylene-propylene copolymer particularly preferred for producing an assembly composed of the adhesive tape of the invention and a profile made EPDM or of another rubberlike material, by hot sealing of the heat-activatable side of the adhesive tape onto the profile, has a melting temperature as determined by DSC of between 140° C. inclusive and 180° C. inclusive, preferably between 150° C. inclusive and 170° C. inclusive. The abbreviation DSC stands for the known thermoanalytical method of "differential scanning calorimetry", according to DIN 53765:1994-03.

The surface of the layer B, which is in direct contact with layer A, in other words the PSA layer crosslinked chemically by thermal initiation or the pressure-sensitively adhesive carrier layer crosslinked chemically by thermal initiation, has been corona- or plasma-pretreated prior to the establishment of said contact, the corona pretreatment or plasma pretreatment having taken place in an atmosphere of nitrogen, carbon dioxide, or a noble gas, or in a mixture of at least two of these gases.

Corona pretreatment refers to surface treatment with filamentary discharges that is generated by high alternating voltage between two electrodes, with the discrete discharge channels impinging on the substrate surface to be treated. More particularly, the term "corona" usually refers to "dielectric barrier discharge" (DBD). In this case at least one of the electrodes consists of a dielectric, in other words an insulator, or is covered or coated with such a material.

Corona pretreatment, as method for surface pretreatment, is known prior art (in this regard, see also Wagner et al., Vacuum, 71 (2003), pages 417 to 436) and is much in use industrially. Without further qualification, the assumed process gas is ambient air, but that is not the case in this invention. The use of process gases other than air, such as nitrogen, carbon dioxide, or noble gases, for example, is likewise known in the form of prior art.

The substrate is placed in or guided through the discharge space between an electrode and a counterelectrode, this being defined as direct physical treatment. Substrates in web form are typically conveyed between an electrode and a grounded roll.

By means of a suitably high web tension, the substrate is pressed onto the counterelectrode, in the latter's roll configuration, in order to prevent air inclusions. The treatment distance is typically about 1 to 2 mm. A fundamental disadvantage of a two-electrode geometry of this kind, with treatment in the space between electrode and counterelectrode, is the possible reverse-face treatment. In the case of very small inclusions of air or gas on the reverse face, as for example if the web tension is too low in the case of a roll-to-roll treatment, there is usually unwanted corona treatment of the reverse face.

Although in the wider sense a corona treatment in air is a technology in which plasma plays a part, a narrower definition is usually understood for plasma treatment at atmospheric pressure.

If a corona treatment takes place in a gas mixture other than air, as for example a nitrogen-based gas mixture, the term "plasma" is indeed in part appropriate. A plasma treatment at atmospheric pressure in the narrower sense, however, is a homogenous and discharge-free treatment. By use of noble gases, in some cases with admixtures, a plasma of such homogeneity can be produced, for example. In this case the treatment takes place in a flat, homogeneously plasma-filled reaction space.

The reactive plasma contains radicals and free electrons which are able to react rapidly with many chemical groups in the substrate surface. This leads to the formation of gaseous reaction products and to highly reactive free radicals in the surface. Through secondary reactions with other gases, these free radicals are able rapidly to undergo further reaction, and they form different chemical functional groups on the substrate surface. As with all plasma technologies, the generation of functional groups competes with the breakdown of the material.

The substrate to be treated, instead of being exposed to the reaction space of a two-electrode geometry, may also be exposed only to the discharge-free plasma ("indirect" plasma). To a good approximation, in that case, the plasma is usually also free of potential. In this case the plasma is usually expelled from the discharge zone by a flow of gas, and, after a short distance, guided onto the substrate. The lifetime (and hence also the useful distance) of the reactive plasma, often called "afterglow", is determined by the precise details of the recombination reactions and of the plasma chemistry. The reactivity is usually observed to decline exponentially with the distance from the discharge source.

Modern indirect plasma technologies are often based on a nozzle principle. The nozzle here may be of round or linear configuration; in some cases, rotary nozzles are operated—there is no desire here to impose any restriction. A nozzle principle of this kind is advantageous on account of its flexibility and its inherently single-sided treatment. Such nozzles, from the company Plasmatreat GmbH (Germany), for example, are widespread in industry for the pretreatment of substrates prior to adhesive bonding. Disadvantages are the indirect treatment, which, being discharge-free, is less efficient, and hence the reduced web speeds. The customary constructional form of a round nozzle, however, is especially suitable for treating narrow webs of product, such as an adhesive tape with a breadth of a few centimeters, for example.

There are a variety of plasma generators on the market, differing in the plasma generation technology, the nozzle geometry, and the gas atmosphere. Although the treatments differ in factors including the efficiency, the fundamental effects are usually similar and are determined above all by the gas atmosphere employed. Plasma treatment may take place in different atmospheres, with this invention having found nitrogen, carbon dioxide, or a noble gas, or a mixture of at least two of these gases, to constitute a suitable atmosphere.

In principle it is also possible to admix the atmosphere with coating or polymerizing constituents, in the form of gas (ethylene, for example) or liquids (in atomized form as aerosol). There is virtually no restriction on the aerosols that are suitable. The indirectly operating plasma technologies in particular are suitable for the use of aerosols, since there is no risk of fouling of the electrodes.

Since the effects of a plasma treatment are of chemical nature and the focus is on changing the surface chemistry, the methods described above may also be described as chemical-physical treatment methods. Although there may be differences in the detail, no particular technique is to be emphasized for the purposes of this invention, in terms neither of the nature of the plasma generation nor of the mode of construction.

Plasma pretreatment in this invention means an atmospheric-pressure plasma pretreatment. Defined as atmospheric-pressure plasma in this invention is an electrically activated, homogeneous, reactive gas which is not in thermal equilibrium, with a pressure close to the ambient pressure. As a result of the electrical discharges and of ionization processes in the electrical field, the gas is activated, and highly excited states are generated in the gas constituents. The gas used or the gas mixture is referred to as process gas. In principle the plasma atmosphere may also be admixed with coating or polymerizing constituents, in the form of gas or aerosol.

The term "homogeneous" points to the fact that no discrete, inhomogeneous discharge channels impinge on the surface of the substrate to be treated (although they may be present in the generation space).

The restriction "not in thermal equilibrium" means that the temperature of the ions may differ from the temperature of the electrons. In the case of thermally generated plasma, these would be at equilibrium (in this regard, see also, for example, Akishev et al., Plasmas and Polymers, vol. 7, No. 3, September 2002).

With regard to the inventive atmosphere of nitrogen, carbon dioxide, or a noble gas, or of a mixture of at least two of these gases, it should be ensured that there are no—or at any rate only very small—fractions of residual oxygen present in this atmosphere. Target oxygen fractions are not more than 1000 ppm, preferably not more than 100 ppm, more preferably not more than 10 ppm.

The intensity of a corona treatment is reported as the "dose" in [W*min/m$^2$], where the dose D=P/(b*v), where P=electrical power [W], b=electrode breadth [m], and v=web speed [m/min].

The corona pretreatment takes place preferably with a dose of 1 to 150 W*min/m$^2$. Particularly preferred are a dose from 10 to 100 W*min/m$^2$, and more particularly a dose from 20 to 80 W*min/m$^2$.

In accordance with the invention, layer A and layer B are in direct contact with one another. This means that between the corona- or plasma-pretreated surface of the layer B that is in direct contact with layer A, no additional, further substances or layers are attached or are located there. Direct contact, accordingly, entails no additional adhesive, PSA, adhesion-promoting substance, or other substance being located or introduced between layer A and layer B. The direct contact between layer A and layer B is produced by a conventional backing or laminating procedure, preferably at room temperature. The backing or laminating procedure takes place preferably directly after the corona or plasma pretreatment at the surface of the layer B. Ideally only a few seconds elapse between the corona or plasma pretreatment of the surface of the layer B, and the backing or laminating procedure, preferably less than 20 seconds, more preferably less than ten seconds). The contact between layer A and the corona or plasma pretreated surface of the layer B is preferably prepared in the already chemically crosslinked state of the layer A, in other words at a point in time when the crosslinking reaction proceeding by means of thermal initiation has already advanced to such an extent that layer A is no longer meltable. At this point in time, however, the crosslinking must not have been fully concluded, although it may be so. It has emerged, surprisingly, that the anchorage between the layers A and B is especially good and is able to bear diverse loads when the backing or laminating procedure has taken place following attainment of the crosslinked state.

The surface of the layer A, i.e., the layer based on a thermoplastic polymer that is in direct contact with layer B, may be both corona- or plasma-pretreated before this contact is produced. The corona or plasma pretreatment of the layer A may take place alternatively in an atmosphere of air or oxygen or nitrogen or carbon dioxide or a noble gas, or a mixture of the stated gases.

Figure 2:
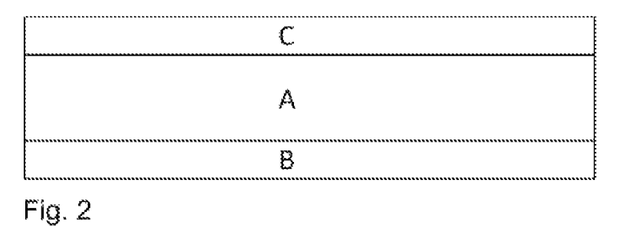
FIG. 2 shows an embodiment of the double-sided adhesive tape of the invention, wherein the surface of the layer A that is not in direct contact with layer B is in direct contact with a further layer C.
Figure 3:
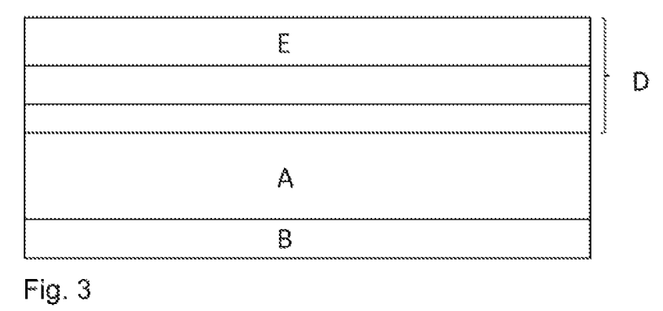
FIG. 3 shows an embodiment of the double-sided adhesive tape of the invention, wherein the surface of the layer A that is not in direct contact with layer B is in direct contact with a further layer sequence D, and the outer layer of the layer sequence is a PSA layer E.

In order to obtain optimized adhesion to difficult-to-bond surfaces, such as, for example, to low-energy surfaces such as polyethylene or polypropylene, for instance, or to certain coated surfaces such as, for instance, certain types of clearcoat, the surface of the layer A that is not in direct contact with layer B may be in direct contact with a further layer (layer C, FIG. 2) or with a further layer sequence (layer sequence D, FIG. 3), the outer layer of the layer sequence being a PSA layer (layer E, FIG. 3), which in that case is designed for the specific use. A layer sequence (D) may be necessary in order, for example, to obtain optimum anchorage between the outer, pressure-sensitively adhesive layer (E) and the layer A of the invention, in order to prevent migration phenomena, or to produce an extremely flat pressure-sensitively adhesive surface. Individual layers in the layer sequence, accordingly, may be adhesion-promoting layers, barrier layers, or smoothing layers, for example. The outer, pressure-sensitively adhesive surface of the adhesive tape may likewise be corona- or plasma-treated for the purpose of achieving optimized adhesion to difficult-to-bond substrates.

According to one particularly advantageous embodiment, the adhesive tape consists only of the two layers A and B. Optionally, one or both sides of the adhesive tape may be covered with a liner.

Figure 1:
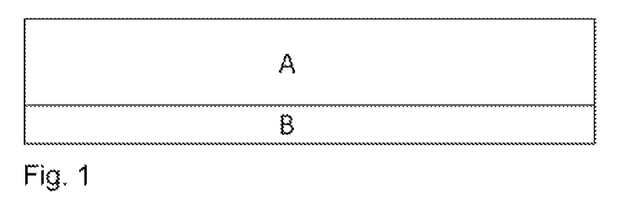
FIG. 1 shows an embodiment of the double-sided adhesive tape of the invention, having a first outer pressure-sensitively adhesive side and a second outer heat-activable side, comprising an at least two-layer product construction composed of the layers A and B.

The double-sided adhesive tape of the invention, having a first outer pressure-sensitively adhesive side and a second outer heat-activatable side, comprising an at least two-layer product construction composed of the layers A and B, as shown in FIG. 1, with layer A being a PSA layer crosslinked chemically by thermal initiation or being a pressure-sensitively adhesive carrier layer crosslinked chemically by thermal initiation, and layer B being a layer based on a thermoplastic polymer, with layer A and layer B being in direct contact with one another, and with the surface of the layer B that is in direct contact with layer A having been corona- or plasma-pretreated, characterized in that the corona or plasma pretreatment has taken place in an atmosphere of nitrogen, carbon dioxide, or a noble gas, or of a mixture of at least two of these gases, exhibits a combination of outstanding product properties such as could not have been foreseen even by the skilled person. Thus the adhesive tape has a high internal bond strength, in other words a high bond strength between the layers A and B. The height of the bond strength is such that destructive loads on the adhesive tape, as in the course of peel tests or shear tests, for example, does not generally result in splitting between the layers A and B. Instead, generally speaking, there is a rupture of material within the layer A or—depending on the substrate used and on the PSA used—there is adhesive failure between the adhesive tape and the bonded substrate. This is also the case when the adhesive tape, as intended, has been laminated hot onto a substrate, at temperatures of 150° C. to 200° C., for example. This temperature exposure has no adverse effect on the bond strength between the layers A and B. After treatments under hot and humid conditions as well, as for example after two-week storage under conditions of 85° C. and 85% relative humidity, the high bond strength is retained, as it is after two-week storage under alternating conditions, with cycles of 4 hours −40° C., 4 hours heating/cooling, 4 hours 80° C./80% relative humidity. Furthermore, the bond strength is also retained when the destructive tests are performed at elevated temperatures, as for example at 70° C. A proviso is that the testing temperature does not exceed the melting temperature of the layer B.

The double-sided adhesive tape of the invention can be produced in a manner such that the polymerization of the PSA or of the pressure-sensitively adhesive carrier layer, and their crosslinking, take place in a process decoupled from that of coating. In this way, very economic production operations with high coating speeds can be presented.

Moreover, the double-sided adhesive tape of the invention can be produced advantageously in very thick layers and also with a foamed layer. The adhesive tape, accordingly, is able to perform, for example, gap-bridging sealing functions or contributions to noise suppression.

With the double-sided adhesive tape of the invention, very high bond strengths can be realized, of 50 or more N/cm. It is also possible to obtain very high shear strengths. Contributions to this may come very advantageously from the foaming, and also from the high thicknesses that are realizable.

With the double-sided adhesive tape of the invention, composite articles can be produced that are composed of this adhesive tape and an article made of a thermoplastic polymer, of EPDM, or of another rubberlike material.

The double-sided adhesive tape of the invention is suitable for adhesively bonding profiles of EPDM or of another rubberlike material.

The examples below are intended to describe the invention in more detail, without any intention for the invention to be restricted thereby.

The test methods below were used to provide brief characterization of the specimens produced in accordance with the invention:

Dynamic Mechanical Analysis (DMA) for Determining the Storage Modulus G' and the Loss Modulus G"

For characterizing the PSA layer or the pressure-sensitively adhesive carrier layer, determinations of the storage modulus G' and of the loss modulus G" were made by means of Dynamic Mechanical Analysis (DMA).

The measurements were made using the shear stress-controlled rheometer DSR 200 N from Rheometric Scientific in an oscillation experiment with a sinusoidally oscillating shearing stress in a plate/plate arrangement. The storage modulus G' and the loss modulus G" were determined in a frequency sweep from $10^{-1}$ to $10^{2}$ rad/sec at a temperature of 25° C. a and G" are defined as follows:

$G' = \tau/\gamma \cdot \cos(\delta)$ ($\tau$=shear stress, $\gamma$=deformation, $\delta$=phase angle=phase shift between shear stress vector and deformation vector).

$G'' = \tau/\gamma \cdot \sin(\delta)$ ($\tau$=shear stress, $\gamma$=deformation, $\delta$=phase angle=phase shift between shear stress vector and deformation vector).

The definition of angular frequency is as follows: $\omega = 2\pi \cdot f$ (f=frequency). The unit is rad/sec.

The thickness of the samples measured was always between 0.9 and 1.1 mm (1±0.1 mm). The sample diameter was in each case 25 mm. Pre-tensioning took place with a load of 3N. For all of the measurements, the stress of the sample bodies was 2500 Pa.

Dynamic Mechanical Analysis (DMA) for Determining the Complex Viscosity ($\eta^*$)

For characterizing the PSA layer or the pressure-sensitively adhesive carrier layer, determinations of the complex viscosity were made by means of Dynamic Mechanical Analysis (DMA).

The measurements were made using the shear stress-controlled rheometer DSR 200 N from Rheometric Scientific in an oscillation experiment with a sinusoidally oscillating shearing stress in a plate/plate arrangement. The complex viscosity was determined in a temperature sweep from −50° C. to +250° C. with an oscillation frequency of 10 rad/s. The complex viscosity $\eta^*$ is defined as follows: $\eta^* = G^*/\omega$ ($G^*$=complex shear modulus, $\omega$=angular frequency).

The further definitions are as follows:

(G"=viscosity modulus (loss modulus), G'=elasticity modulus (storage modulus)).

$G'' = \tau/\gamma \cdot \sin(\delta)$ ($\tau$=shear stress, $\gamma$=deformation, $\delta$=phase angle=phase shift between shear stress vector and deformation vector).

$G' = \tau/\gamma \cdot \cos(\delta)$ ($\tau$=shear stress, $\gamma$=deformation, $\delta$=phase angle=phase shift between shear stress vector and deformation vector).

$\omega = 2\pi \cdot f$ (f=frequency).

The thickness of the samples measured was always between 0.9 and 1.1 mm (1±0.1 mm). The sample diameter was in each case 25 mm. Pre-tensioning took place with a load of 3N. For all of the measurements, the stress of the sample bodies was 2500 Pa.

Peel Strength

The peel strength was determined in accordance with PSTC-101. The determination took place under test conditions of 23° C.+/−1° C. temperature and 50%+/−5% relative humidity. An assembly was produced from the adhesive tape of the invention and a test substrate selected in line with the thermoplastic polymer used for the layer B. The test substrates were always selected from the same type of polymer corresponding to the particular thermoplastic polymer used for the layer B. Where, for example, the thermoplastic polymer of layer B was a polyurethane, therefore, a thermoplastic polyurethane test substrate was selected as well. In the case of the polypropylene products, additionally, commercial EPDM profiles of different Shore A hardnesses, from Meteor Gummiwerke, were used as test substrates.

The assembly was produced by hot lamination of the adhesive tape of the invention, by its layer B, onto the test substrate. The required temperature was produced using a hot-air blower and was dependent on the thermoplastic polymer used for the layer B.

A strip of aluminum was mounted on layer A. The adhesive tape of the invention was incised with a scalpel close to the substrate and then clamped, together with the aluminum strip, into the jaws of a tensile testing machine. Tearing apart or peeling took place using rubberlike substrates, in a geometry which, when viewed from the side, resembles a recumbent "T". Where solid, stiff substrates were used, peeling took place at an angle of 90°. The peel rate was 300 mm/min.

The objective was to ascertain whether there is a weakness in assembly between layers A and B or whether the failure occurs within a layer, and the extent of the failure force.

Shear Test

The shear test was carried out in accordance with test specification PSTC-107. The test specimens were prepared by welding two adhesive tape strips of the invention to one another via their layers B, by hot lamination using a hot-air blower, to produce a double-sidedly pressure-sensitively adhesive tape specimen. This double-sidedly pressure-sensitively adhesive tape specimen was bonded between two steel plates (stainless steel 302 to ASTM A 666; 50 mm×125 mm×1.1 mm, bright annealed surface; surface roughness 50±25 mm mean arithmetic deviation from the baseline), pressed on four times with a 2 kg weight, and then exposed to a sustained, constant shearing load selected such that the adhesive tape specimen fails after a relatively long time. Determinations were made of whether there is a weakness in assembly between the layers A and B, or whether the failure occurs within a layer, and the length, in minutes, of the holding power.

The bond area was 13×20 mm$^2$ in each case. The shearing load on this bond area was 2 kg. Measurement took place at room temperature (23° C.) and in some cases at 70° C. as well.

Aging Characteristics

The assemblies of the adhesive tape of the invention and a substrate, as were produced for the measurement of the peel strength, were subjected to storage under selected conditions, in order to ascertain the aging characteristics.

Storage a): Two-week storage under conditions of 85° C. and 85% relative humidity Storage b): Two-week storage under cyclical conditions, with the following cycles: 4 hours −40° C., 4 hours heating/cooling, 4 hours 80° C./80% relative humidity.

When the storage time was up, the samples were subjected to the peel strength test.

Static Glass Transition Temperature

The static glass transition temperature is determined by dynamic scanning calorimetry in accordance with DIN 53765. The figures for a glass transition temperature $T_g$ are based on the glass transformation temperature value $T_g$ according to DIN 53765: 1994-03, unless indicated otherwise in any specific case.

Molecular Weights

The average molecular weight $M_w$ and the average molecular weight $M_n$, and the polydispersity D, were determined by means of gel permeation chromatography (GPC). The eluent used was THF with 0.1 vol % trifluoroacetic acid. Measurement took place at 25° C. The preliminary column used was a PSS-SDV, 5 μm, $10^3$ Å, ID 8.0 mm×50 mm. Separation took place using the columns PSS-SDV, 5 μm, $10^3$ Å, $10^5$ Å, and $10^6$ Å, each with ID 8.0 mm×300 mm. The sample concentration was 4 g/l, the flow rate 1.0 ml per minute. Measurement took place against PMMA standards.

Differential Scanning Calorimetry (DSC)

The melting temperature of polymers and copolymers is determined calorimetrically via Differential Scanning calorimetry (DSC) in accordance with DIN 53765:1994-03. Heating curves run with a heating rate of 10 K/min. The specimens are measured in Al crucibles with perforated lids under a nitrogen atmosphere. The heating curve evaluated is the second curve. A melting temperature can be made out as a peak on the thermogram. The melting temperature recorded is the temperature at which the highest thermal change occurs.

EXAMPLES

The raw materials used for preparing polyacrylate PSAs were as follows:

| Chemical compound | Trade name | Manufacturer | CAS No. |
|---|---|---|---|
| Bis(4-tert-butylcyclohexyl) peroxydicarbonate | PERKADOX 16 | Akzo Nobel | 15520-11-3 |
| 2,2'-Azobis(2-methyl-propionitrile), AIBN | VAZO 64 | DuPont | 78-67-1 |
| 2,2'-Azobis(2-methyl-butyronitrile) | VAZO 67 | DuPont | 13472-08-7 |
| Pentaerythritol tetraglycidyl ether | POLYPOX R16 = | UPPC AG | 3126-63-4 |
| 3,4-Epoxycyclohexylmethyl 3,4-epoxycyclohexane-carboxylate | UVACURE 1500 | Cytec Industries Inc. | 2386-87-0 |
| Triethylenetetramine | EPIKURE 925 | Hexion Speciality Chemicals | 112-24-3 |
| Microballoons (MB) (dry unexpanded microspheres, diameter 9 to 15 μm, expansion onset temperature 106 to 111° C., TMA density ≤25 kg/m$^3$) | EXPANCEL 051 DU 40 | Expancel Nobel Industries | |
| Terpene-phenolic resin (softening point 110° C.; $M_w$ = 500 to 800 g/mol; D = 1.50) | DERTOPHENE T110 | DRT resins | 25359-84-6 |
| Acrylic acid n-butyl ester | n-Butyl acrylate | Rohm & Haas | 141-32-2 |
| Acrylic acid | Acrylic acid, pure | BASF | 79-10-7 |
| 2-Ethylhexyl acrylate | | Brenntag | 103-11-7 |
| Methyl acrylate | | BASF | 96-33-3 |

The expansion capacity of the microballoons can be described through the determination of the TMA density [kg/m$^3$] (Stare Thermal Analysis System from Mettler Toledo; heating rate 20° C./min). This TMA density is the minimum achievable density at a defined temperature $T_{max}$ under atmospheric pressure before the microballoons collapse.

The softening point of the resins is determined according to DIN ISO 4625.

An example polyacrylate PSA 1 (abbreviated designation in the examples: AC1) was prepared as follows: a reactor conventional for radical polymerizations was charged with 54.4 kg of 2-ethylhexyl acrylate, 20.0 kg of methyl acrylate, 5.6 kg of acrylic acid, and 53.3 kg of acetone/isopropanol (94:6). After nitrogen gas had been passed through the reactor for 45 minutes, with stirring, the reactor was heated to 58° C. and 40 g of VAZO 67, in solution in 400 g of acetone, were added. Thereafter the external heating bath was heated to 75° C. and the reaction was carried out constantly at this external temperature. After 1 hour a further 40 g of VAZO 67, in solution in 400 g of acetone, were added, and after 4 hours the batch was diluted with 10 kg of acetone/isopropanol mixture (94:6).

After 5 hours and again after 7 hours, initiation was repeated with 120 g portions of bis(4-tert-butylcyclohexyl) peroxydicarbonate, in each case in solution in 400 g of acetone. After a reaction time of 22 hours, the polymerization was discontinued and the batch was cooled to room temperature. The product had a solids content of 55.9% and was freed from the solvent under reduced pressure in a concentrating extruder (residual solvent content ≤0.3 weight %). The resulting polyacrylate had a K value of 58.8, an average molecular weight of $M_w=746\ 000$ g/mol, a polydispersity of D $(M_w/M_n)=8.9$, and a static glass transition temperature of $T_g=-35.6°$ C.

This base polymer was melted in a feeder extruder (single-screw conveying extruder from Troester GmbH & Co. KG, Germany) and conveyed in the form of polymer melt by this extruder, via a heatable hose, into a planetary roller extruder from Entex (Bochum). Via a metering port, the melted resin DERTOPHENE T 110 was then added, giving the melt a resin concentration of 28.3 weight %. Also added was the crosslinker POLYPDX R16. Its concentration in the melt was 0.14 weight %. All of the components were mixed to form a homogeneous polymer melt.

By means of a melt pump and a heatable hose, the polymer melt was transferred to a twin-screw extruder (from Berstoff). There the accelerator EPIKURE 925 was added. Its concentration in the melt was 0.14 weight %. The entire polymer mixture was then freed from all gas inclusions in a vacuum dome under a pressure of 175 mbar. Downstream of the vacuum zone, the microballoons were metered in and were incorporated homogeneously into the polymer mixture by means of a mixing element. Their concentration in the melt was 0.7 weight %. The resulting melt mixture was transferred into a die.

Following departure form the die, in other words after a drop in pressure, the incorporated microballoons underwent expansion, with the drop in pressure producing shear-free cooling of the polymer material. This gave a foamed polyacrylate PSA, which was subsequently shaped to web form in a thickness of 0.8 mm, using a roll calender, and was enclosed in a double-sidedly siliconized release film (50 µm, polyester), while the chemical crosslinking reaction went on. After being wound up, the film is stored at room temperature for at least two weeks, before being used further for adhesive tape production in accordance with the invention.

An example polyacrylate PSA 2 (abbreviated designation in the examples: AC2) was prepared as follows:

a 100 l glass reactor conventional for radical polymerizations was charged with 4.8 kg of acrylic acid, 11.6 kg of butyl acrylate, 23.6 kg of 2-ethylhexyl acrylate, and 26.7 kg of acetone/benzine 60/95 (1:1). After nitrogen gas had been passed through the reactor for 45 minutes, with stirring, the reactor was heated to 58° C. and 30 g of AIBN were added. Thereafter the external heating bath was heated to 75° C. and the reaction was carried out constantly at this external temperature. After a reaction time of 1 hour a further 30 g of AIBN were added. After 4 hours and 8 hours, the batch was diluted with 10.0 kg each time of acetone/benzine 60/95 (1:1) mixture. To reduce the residual initiators, 90 g portions of bis(4-tert-butylcyclohexyl) peroxydicarbonate were added after 8 hours and again after 10 hours. After a reaction time of 24 hours, the polymerization was discontinued and the batch was cooled to room temperature. The polyacrylate was subsequently blended with 0.2 weight % of the crosslinker UVACURE® 1500, diluted to a solids content of 30% with acetone, and then coated from solution onto a double-sidedly siliconized release film (50 µm, polyester) (coating speed 2.5 m/min, drying tunnel 15 m, temperatures: zone 1: 40° C., zone 2: 70° C., zone 3: 95° C., zone 4: 105° C.). The thickness was 50 µm. After being wound up, the film is stored at room temperature for at least two weeks, before being used further for adhesive tape production in accordance with the invention.

The polyacrylate PSAs, described by way of example in terms of their composition and preparation methodology, are described comprehensively in DE 10 2010 062 669 A1. The disclosure content of that specification is explicitly incorporated into the disclosure content of the present invention.

The raw materials used for preparing the polyurethane PSA were as follows:

| Trade name | Chemical basis | Mean number-average molar mass $M_n$ (g/mol) | OH number or NCO number (mmol OH/kg or mmol NCO/kg) | Manufacturer/supplier |
|---|---|---|---|---|
| VORANOL P 400 ® | Polypropylene glycol, diol | 400 | 4643 | Dow |
| VORANOL CP 6055 ® | Polypropylene glycol, triol | 6000 | 491 | Dow |
| MPDIOL ® | 2-methyl-1,3-propanediol | 90.12 | 22193 | Lyondell |
| VESTANAT IPDI ® | Isophorone diisocyanate (IPDI) | 222.3 | 8998 | Degussa |
| DESMODUR W ® | Dicyclohexyl-methane diisocyanate (HMDI) | 262 | 7571 | Bayer |
| COSCAT 83 ® | Bismuth trisneodecanoate CAS No. 34364-26-6 | | | Caschem |

An example polyurethane PSA (abbreviated designation in the examples: PU 1) was prepared as follows:

First of all a pressure-sensitively adhesive, hydroxyl-functionalized polyurethane hotmelt prepolymer was prepared by homogenously mixing and thus chemically reacting the following starting materials in the proportions indicated:

TABLE 2

Composition of the hydroxyl-functionalized polyurethane hotmelt prepolymer, example 1

| Starting material | Weight fraction (weight %) | Percentage ratio of the number of OH groups to one another | Percentage ratio of the number of OH group-bearing molecules to one another (idealized)* | Percentage ratio of the number of all functionalized molecules to one another (idealized)* |
|---|---|---|---|---|
| VORANOL P 400 | 21.7 | 42.0 | 43.4 | 22.5 |
| VORANOL CP 6055 | 48.9 | 10.0 | 6.9 | 3.6 |
| MP DIOL | 5.2 | 48.0 | 49.7 | 25.7 |
| COSCAT 83 | 0.1 | | | |
| VESTANAT IPDI | 24.1 | | | 48.2 |
| Total | 100.0 | 100.0 | 100.0 | 100. |

*Calculated from the weight fractions and OH numbers or NCO numbers of the starting materials, subject to the highly idealized assumption that the VORANOL P 400 has a functionality of exactly 2 and the VORANOL CP 6055 has a functionality of exactly 3.

First of all, all of the starting materials listed, apart from the MP DIOL and the VESTANAT IPDI, were mixed at a temperature of 70° C. under a pressure of 100 mbar for 1.5 hours. The MP DIOL was then mixed in over 15 minutes, followed by the VESTANAT IPDI, likewise over a period of 15 minutes. The heat of reaction caused the mixture to heat up to 100° C., at which point it was transferred to a storage vessel.

The NCO/OH ratio was 0.90. The theoretical gel point is calculated to 0.91.

The resulting prepolymer was solid at room temperature in terms of its consistency, was rubberlike and pressure-sensitively adhesive (inherently tacky). The complex viscosity $\eta^*$ at room temperature (23° C.) was 18 000 Pas and at 70° C. was 210 Pas.

The weight-average mean molar mass $M_w$ was 120 000 g/mol, the mean number-average molar mass $M_n$ 17 600 g/mol.

The resulting prepolymer was meltable.

To produce a pressure-sensitively adhesive carrier layer crosslinked chemically by thermal initiation, the prepolymer was supplied continuously to a twin-screw extruder preheated to 80° C. The crosslinker was metered continuously, at the same time and at the same location, into the twin-screw extruder. The crosslinker used was DESMODUR W (dicyclohexylmethane diisocyanate).

A total NCO/OH ratio of 1.05 was established.

The mixing ratios were therefore as follows:

100 parts by weight prepolymer: 4.54 parts by weight DESMODUR W.

Mixing and conveying took place continuously. The time taken for the extrudate to emerge from the extruder was approximately two minutes.

The extrudate was supplied directly to a two-roll applicator, in which it was coated between two convergent, double-sidedly siliconized polyester sheets and thus shaped to form a film. The thickness of the film was 0.8 mm. After cooling to room temperature, the film was wound up, following the removal beforehand of one of the two siliconized polyester sheets. The wound film was stored at room temperature for at least two weeks, before being used further for adhesive tape production in accordance with the invention. G' at 1 rad/sec and 23° C. was 120 000 Pa, G" at 1 rad/sec and 23° C. was 90 000 Pa, G' at 10 rad/sec and 23° C. was 360 000 Pa, and G" at 10 rad/sec and 23° C. was 200 000 Pa.

The following thermoplastic polymers were used for producing layer B:

| Designation in the examples | Trade name | Manufacturer | Manufacturer description |
|---|---|---|---|
| TP1 | Polypropylene BA 110 CF | Borealis | Heterophase polypropylene copolymer without slip or antiblock additives, DSC melting temperature: 158° to 162° C. |
| TP2 | Polypropylene BHC 5012 | Borealis | Heterophase polypropylene copolymer without slip or antiblock additives, DSC melting temperature: 158° to 162° C. |
| TP3 | DESMOMELT 530 | Bayer | Highly crystalline, elastic polyurethane with very low thermoplasticity, minimum activation temperature about 55° C. |
| TP4 | EPACOL TK 42 | Epaflex | Thermoplastic polyurethane of high crystallinity, activation temperature: 55° to 60° C. |
| TP5 | PLATAMID M 1276 T | Arkema | High molecular mass copolyamide of nylon type in pellet form, m.p. 110° to 115° C. (DIN 53736, method A) |

Shaping operations to give a film in a respective thickness of 50 μm took place by means of a conventional single-screw extruder. In the case of the Polypropylene BA 110 CF, the film produced from it was obtained from Renolit AG, Salzgitter.

The physical treatments of the layer B were carried out in a roll-to-roll process with a corona unit featuring a Corona-Plus generator from Vetaphone A/S (Denmark) with a conventional DBD configuration. Insertion cassettes with metal-electrode blades 0.6 m wide and a grounded, silicone-clad roll were used. The distance of the electrodes from the roll was 2.0 mm. Treatments took place with a web speed of 20 m/min. The electrode housing was flooded with the respective process gas, with a gas flow rate of 20 m³/h. The residual oxygen content of the process gas atmosphere was always <10 ppm oxygen.

As an alternative it would also be possible, without restriction, to use another commercially available unit for the treatment with process gas corona, as for example a unit with the designation ALDYNE™ from SOFTAL Corona & Plasma GmbH (Germany). Alternatively, the corresponding physical pretreatments of the layer B, at least in a nitrogen atmosphere, could also be carried out with a homogeneous, indirect atmospheric pressure plasma. For that purpose it would be possible to use an FG5001 laboratory unit from Plasmatreat GmbH (Steinhagen) with an RD1004 rotational nozzle, with a rate of transit of layer B (web speed) of 5 m/min at a distance of 10 mm from the surface of layer B. No substantial differences have been found.

To produce double-sided adhesive tapes of the invention, the crosslinked PSA layers produced and the thermoplastic polymer layers were combined with one another in the manner below and immediately after physical pretreatment of the thermoplastic layers, under a process gas atmosphere, were brought into contact with one another by lamination at room temperature.

|  | Layer A | Layer B | Layer C | Process gas | Corona dose (W * min/m²) |
|---|---|---|---|---|---|
| Example 1 | AC 1 | TP 1 |  | Nitrogen | 35 |
| Example 2 | AC 1 | TP 1 |  | Nitrogen | 70 |
| Example 3 | AC 1 | TP 1 |  | Carbon dioxide | 35 |
| Example 4 | AC 1 | TP 1 |  | Carbon dioxide | 70 |
| Example 5 | AC 1 | TP 1 |  | Argon | 35 |
| Example 6 | AC 1 | TP 1 |  | Argon | 70 |
| Example 7 | AC 1 | TP 2 |  | Nitrogen | 35 |
| Example 8 | AC 1 | TP 2 |  | Nitrogen | 70 |
| Example 9 | AC 1 | TP 3 |  | Nitrogen | 35 |
| Example 10 | AC 1 | TP 3 |  | Nitrogen | 70 |
| Example 11 | AC 1 | TP 4 |  | Nitrogen | 35 |
| Example 12 | AC 1 | TP 4 |  | Nitrogen | 70 |
| Example 13 | AC 1 | TP 5 |  | Nitrogen | 35 |
| Example 14 | AC 1 | TP 5 |  | Nitrogen | 70 |
| Example 15 | PU 1 | TP 1 | AC 2 | Nitrogen | 35 |
| Example 16 | PU 1 | TP 1 | AC 2 | Nitrogen | 70 |
| Example 17 | PU 1 | TP 1 | AC 2 | Carbon dioxide | 35 |
| Example 18 | PU 1 | TP 1 | AC 2 | Carbon dioxide | 70 |
| Comparative Example 1 | AC 1 uncrosslinked | TP 1 |  | Nitrogen | 70 |
| Comparative Example 2 | AC 1 | TP 1 |  | Air | 70 |

Test Results:

Peel Strength:

In the peel strength test, in examples 1 to 18, there was always cohesive failure found within the layer A. In examples 1 to 14, the force which led to the cohesive failure of the layer A, i.e., the splitting force, was 25 to 30 N/cm.

In examples 15 to 18, the splitting force was 38 to 42 N/cm.

In comparative examples 1 and 2, there was adhesive failure between the layers A and B.

After a) and b) storage for determining the aging characteristics, there was again always cohesive failure within the layer A in examples 1 to 18, although the splitting forces were reduced by 20% to 30% relative to the figures reported above.

Shear Test:

In the shear test, in examples 1 to 18, there was always cohesive failure found within the layer A. In examples 1 to 14, the holding power at room temperature was 100 to 500 minutes. In examples 15 to 18, the holding power at room temperature was 2500 to 10 000 minutes. Examples 15 to 18 were also tested at 70° C. There as well there was cohesive failure within the layer A. The holding powers were 200 to 400 minutes. In comparative examples 1 and 2, there was adhesive failure between the layers A and B.

The invention claimed is:

1. A double-sided adhesive tape comprising an at least two-layer product system composed of layers A and B, wherein
  layer A comprises a pressure-sensitive adhesive crosslinked chemically by thermal initiation, or a pressure-sensitively adhesive carrier layer crosslinked chemically by thermal initiation, and
  layer B comprises a polyolefin or a polyolefin mixture, and
  layer A and layer B being in direct contact with one another, and
  the surface of layer B that is in direct contact with layer A having been corona- or plasma-pretreated,
  and further wherein
  layer A is foamed by extrusion, whereby a crosslinker system and the pressure-sensitive adhesive in a melted state are introduced together into a continuously operating mixing assembly to commence crosslinking reaction, followed by the melt being discharged from the mixing assembly and being immediately coated on layer B and shaped to form layer A,
  layer A that is in contact with the corona- or plasma-pretreated surface of the layer B has been brought into contact in the chemically crosslinked state with the corona- or plasma-pretreated surface of the layer B, and
  the corona or plasma pretreatment has taken place in atmosphere of nitrogen, carbon dioxide, or a noble gas, or a mixture of at least two of these gases.

2. The double-sided adhesive tape as claimed in claim 1, wherein no additional actinic or ionizing radiation is used for crosslinking layer A.

3. The double-sided adhesive tape as claimed in claim 1 wherein layer A is a layer based on polyacrylate or polyurethane.

4. The double-sided adhesive tape as claimed in claim 3, wherein layer A is a layer based on polyacrylate.

5. The double-sided adhesive tape as claimed in claim 1 wherein the surface of the layer A that is not in direct contact with the corona- or plasma-pretreated surface of the layer B is in direct contact with a further layer or with a further layer sequence, the outer layer of the further layer or of the further layer sequence being a layer of pressure-sensitive adhesive.

6. The double-sided adhesive tape as claimed in claim 1 wherein layer B is a layer based on a polypropylene copolymer or a mixture of a polypropylene copolymer and another polyolefin.

7. The double-sided adhesive tape as claimed in claim 1 wherein layer B has a melting temperature as determined by Differential Scanning calorimetry (DSC) of between 140° C. inclusive and 180° C. inclusive.

8. The double-sided adhesive tape as claimed in claim 1 wherein the surface of the layer A that is in contact with the corona- or plasma-pretreated surface of the layer B has been corona-pretreated in an atmosphere of air or oxygen or nitrogen or carbon dioxide or a noble gas, or a mixture of the stated gases.

* * * * *